(12) United States Patent
Morise et al.

(10) Patent No.: US 7,134,536 B2
(45) Date of Patent: Nov. 14, 2006

(54) HYDRAULIC CONTROL CIRCUIT FOR AUTOMATIC TRANSMISSION OF VEHICLE

(75) Inventors: Masaru Morise, Nukata-gun (JP); Hideki Miyata, Okazaki (JP); Akio Sugawara, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 10/876,700

(22) Filed: Jun. 28, 2004

(65) Prior Publication Data

US 2005/0003922 A1    Jan. 6, 2005

(30) Foreign Application Priority Data

Jul. 2, 2003    (JP)    ............... 2003-270300

(51) Int. Cl.
F16H 61/12    (2006.01)
(52) U.S. Cl. .................. 192/3.58; 192/87.13; 475/116
(58) Field of Classification Search .................. None
See application file for complete search history.

(56) References Cited

U.S. PATENT DOCUMENTS

| | | | | |
|---|---|---|---|---|
| 4,628,772 A | * | 12/1986 | Nishikawa et al. | ......... 477/125 |
| 4,995,285 A | * | 2/1991 | Hayakawa et al. | ......... 477/125 |
| 5,222,581 A | * | 6/1993 | Paulsen | ...... 192/3.58 |
| 6,077,182 A | * | 6/2000 | Long et al. | ........... 475/128 |
| 6,929,584 B1 | * | 8/2005 | Miyata et al. | ............... 477/119 |
| 2006/0025281 A1 | * | 2/2006 | Nozaki et al. | ............... 477/125 |

FOREIGN PATENT DOCUMENTS

JP    9-303545 A    11/1997
JP    2000240776 A    *    9/2000

* cited by examiner

Primary Examiner—Richard M. Lorence
(74) Attorney, Agent, or Firm—Oblon, Spivak, McClelland, Maier & Neustadt, P.C.

(57) ABSTRACT

A hydraulic control circuit for an automatic transmission of a vehicle, the transmission including hydraulically operated coupling devices at least one of which is selectively operated to establish a corresponding one of speed steps, the hydraulic control circuit including electromagnetic valve devices which output respective hydraulic pressures to operate the hydraulically operated coupling devices, respectively, an all-fail detecting and switching valve device which is switched, based on an all-fail state of the electromagnetic valve devices in which none of the electromagnetic valve devices output the respective hydraulic pressures, to an operation state corresponding to a fail position to output, as a first hydraulic pressure, a source hydraulic pressure to a first hydraulically operated coupling device out of the plurality of hydraulically operated coupling devices, and an operation-state memory valve which is switched, based on a state of the vehicle before the all-fail state occurs, from a non-running position indicating that the vehicle is not running, to a running position indicating that the vehicle is running, which is kept at one of the non-running position and the running position, and which supplies an operating hydraulic pressure to one of a second and a third hydraulically operated coupling device out of the plurality of hydraulically operated coupling devices that corresponds to the one of the non-running position and the running position at which the operation-state memory valve is kept.

3 Claims, 6 Drawing Sheets

|      | C1 | C2 | B1 | B2 | B3 |
|------|----|----|----|----|----|
| 1st  | ○  |    |    | ○  |    |
| 2nd  | ○  |    | ○  |    |    |
| 3rd  | ○  |    |    |    | ○  |
| 4th  | ○  | ○  |    |    |    |
| 5th  |    | ○  |    |    | ○  |
| 6th  |    | ○  | ○  |    |    |
| Rev  |    |    |    | ○  | ○  |

HYDRAULIC CONTROL CIRCUIT FOR AUTOMATIC TRANSMISSION OF VEHICLE

The present application is based on Japanese Patent Application No. 2003-270300 filed on Jul. 2, 2003, the contents of which are incorporated herein by reference.

BACKGROUND OF THE INVENTION

1. Field of the Invention

The present invention relates to a vehicle having an automatic transmission including a plurality of hydraulically operated coupling devices at least one of which is selectively operated to establish a corresponding one of a plurality of speed steps, and in particular to a hydraulic control circuit including a plurality of electromagnetic valve devices which output respective hydraulic pressures to operate the hydraulically operated coupling devices of the automatic transmission. More specifically described, the present invention relates to a fail-safe function of the hydraulic control circuit that enables the vehicle to run even when the electromagnetic valve devices may fall in an all-fail state (so-called "off-fail" state) in which none of the electromagnetic valve devices output the respective hydraulic pressures.

2. Discussion of Related Art

There is known a vehicle having an automatic transmission including a plurality of hydraulically operated coupling devices at least one of which is supplied with at least one hydraulic pressure and is selectively operated to establish a corresponding one of a plurality of speed steps. For example, the vehicle additionally has a plurality of electromagnetic valve devices which output respective hydraulic pressures to be supplied directly to the hydraulically operated coupling devices. In this vehicle, the electromagnetic valve devices are operated, according to respective control signals outputted from, e.g., an electronic control device, so as to output at least one hydraulic pressure to at least one hydraulically operated coupling device and thereby establish a desired speed step of the automatic transmission. Therefore, if the control signals outputted from the electronic control device do not reach the electromagnetic valve devices, for some reason, e.g., breaking of wires or separation of connectors, then the electromagnetic valve devices may not output the respective hydraulic pressures and accordingly may not operate the hydraulically operated coupling devices, so that the automatic transmission may not establish the desired speed step and accordingly the vehicle may not run.

Hence, there has been proposed a technique of operating, when the electromagnetic valve devices fall in the "off-fail" state in which none of the electromagnetic valve devices output the respective hydraulic pressures, at least one hydraulically operated coupling device of the automatic transmission and thereby enabling the vehicle to run. An example of this technique is disclosed by Japanese Patent Publication No. 9-303545. In the technique disclosed by this publication, if the electromagnetic valve devices fall in the "off-fail" state and accordingly the automatic transmission cannot establish a desired speed step, then a line pressure, i.e., a source pressure of a hydraulic control circuit associated with the automatic transmission, that is separate from respective hydraulic passages to supply the respective hydraulic pressures of the electromagnetic valve devices to the hydraulically operated coupling devices, is supplied to at least one hydraulically operated coupling device, so as to establish a pre-selected speed step of the automatic transmission and thereby enable the vehicle to run.

However, the hydraulic control circuit disclosed by the above-indicated publication can establish only the single, pre-selected speed step when the off-fail state of the electromagnetic valve devices occurs. Therefore, depending upon a current state of the vehicle when the off-fail state occurs and the pre-selected speed step for the off-fail state, the vehicle may not be able to run appropriately after the occurrence of the off-fail state. For example, if the off-fail state occurs when the vehicle is running at a high speed, and the pre-selected speed step for the off-fail state is a third speed step as a low or intermediate speed step, then a rotation speed of the engine of the vehicle may be so increased as to exceed an overspeed range; and if the off-fail state occurs when the vehicle is stopped, and the pre-selected speed step for the off-fail state is a fifth speed step as a high speed step, then a driving force may not be so high as to be able to start the vehicle. These problems are more serious to such automatic transmissions which have a greater number of speed steps.

SUMMARY OF THE INVENTION

It is therefore an object of the present invention to provide a hydraulic control circuit which hydraulically controls a speed changing operation of a vehicle's automatic transmission including a plurality of hydraulically operated coupling devices at least one of which is selectively operated to establish a corresponding one of a plurality of speed steps, and in particular such a hydraulic control circuit which includes a plurality of electromagnetic valve devices outputting respective hydraulic pressures to operate the hydraulically operated coupling devices of the automatic transmission, and which establishes, when the electromagnetic valve devices fall in the off-fail state in which none of the electromagnetic valve devices output the respective hydraulic pressures, an appropriate speed step corresponding to a current state of the vehicle and thereby enables the vehicle to run appropriately after the occurrence of the off-fail state.

According to a first aspect of the present invention, there is provided a hydraulic control circuit for an automatic transmission of a vehicle, the automatic transmission including a plurality of hydraulically operated coupling devices at least one of which is selectively operated to establish a corresponding one of a plurality of speed steps, the hydraulic control circuit comprising a plurality of electromagnetic valve devices which output respective hydraulic pressures to operate the hydraulically operated coupling devices, respectively; an all-fail detecting and switching valve device which is switched, based on an all-fail state of the electromagnetic valve devices in which none of the electromagnetic valve devices output the respective hydraulic pressures, to an operation state corresponding to a fail position to output a source hydraulic pressure as a first hydraulic pressure, to a first hydraulically operated coupling device of the plurality of hydraulically operated coupling devices; and an operation-state memory valve which is switched, based on a state of the vehicle before the all-fail state of the electromagnetic valve devices occurs, from a non-running position indicating that the vehicle is not running, to a running position indicating that the vehicle is running, which is kept at one of the non-running position and the running position, and which supplies an operating hydraulic pressure to one of a second and a third hydraulically operated coupling device of the plurality of hydraulically operated coupling devices that corresponds to the one of the non-running position and the running position at which the operation-state memory valve is kept.

In the hydraulic control circuit according to the first aspect of the present invention, when the all-fail detecting and switching valve device detects the all-fail or off-fail state of the electromagnetic valve devices in which none of the electromagnetic valve devices output the respective hydraulic pressures, the all-fail detecting and switching valve device is switched to an operation state thereof corresponding to the fail position to output the source hydraulic pressure as the first hydraulic pressure to the first hydraulically operated coupling device, so that the first hydraulically operated coupling device is operated. In addition, the operation-state memory valve is switched, based on a state of the vehicle before the all-fail or off-fail state of the electromagnetic valve devices occurs, from the non-running position indicating that the vehicle is not running, to the running position indicating that the vehicle is running, and is kept at one of the non-running position and the running position. More specifically described, if the vehicle is not running (before an engine of the vehicle is ignited on, i.e., is started) when the off-fail state of the electromagnetic valve devices occurs, then the operation-state memory valve is kept at the non-running position that is an operation state thereof when the off-fail state occurs; and if the vehicle is running when the off-fail state occurs, then the operation-state memory valve is kept at the running position that is an operation state thereof when the off-fail state occurs. Thus, the operation-state memory valve supplies the operating hydraulic pressure to one of the second and third hydraulically operated coupling devices that corresponds to the one of the non-running and running positions at which the operation-state memory valve is kept, so that the one of the second and third hydraulically operated coupling devices is operated. Therefore, based on the non-running, or running, state of the vehicle when the off-fail state of the electromagnetic valve devices occurs, the present hydraulic control circuit can selectively establish a corresponding one of two speed steps of the automatic transmission, by operating the first hydraulically operated coupling device and a corresponding one of the second and third hydraulically operated coupling devices. For example, if the vehicle has not started running yet when the off-fail state occurs, the present hydraulic control circuit may establish a low or intermediate speed step of the automatic transmission, by operating the first and second hydraulically operated coupling devices; and if the vehicle is running when the off-fail state occurs, the present hydraulic control circuit may establish a high speed step of the automatic transmission, by operating the first and third hydraulically operated coupling devices. In this example, if the off-fail state occurs when the vehicle is running, the hydraulic control circuit is prevented from establishing a low or intermediate speed step, so that a rotation speed of the engine of the vehicle is prevented from being so increased as to exceed an overspeed range; and if the off-fail state occurs when the vehicle has not started running yet, the hydraulic control circuit is prevented from establishing a high speed step, so that a driving force of the engine is prevented from being so decreased as to be insufficiently low. Thus, the vehicle can run appropriately after the occurrence of the off-fail state.

According to a preferred feature of the first aspect of the present invention, the all-fail detecting and switching valve device comprises an all-fail detecting valve and a switching valve and, in the all-fail state of the electromagnetic valve devices in which none of the electromagnetic valve devices output the respective hydraulic pressures, the all-fail detecting valve outputs the first hydraulic pressure to each of the operation-state memory valve and the switching valve, the switching valve supplies, when the first hydraulic pressure is inputted thereto, the first hydraulic pressure to the first hydraulically operated coupling device, and the operation-state memory valve supplies, as the operating hydraulic pressure, one of the source hydraulic pressure and the first hydraulic pressure to the one of the second and third hydraulically operated coupling devices.

In the hydraulic control circuit according to the preferred feature of the first aspect of the present invention, when the off-fail state of the electromagnetic valve devices occurs, the first and second hydraulically operated coupling devices, or the first and third hydraulically operated coupling devices are operated based on one of the non-running position and the running position that is an operation state of the operation-state memory valve when the off-fail state occurs and is kept by the memory valve after the occurrence of the fail-safe state. Thus, the present hydraulic control circuit can establish either one of two speed steps of the automatic transmission. For example, if the vehicle has not started running yet when the off-fail state occurs, the present hydraulic control circuit may establish a low or intermediate speed step of the automatic transmission, by operating the first and second hydraulically operated coupling devices; and if the vehicle is running when the off-fail state occurs, the present hydraulic control circuit may establish a high speed step of the automatic transmission, by operating the first and third hydraulically operated coupling devices. In this example, if the off-fail state occurs when the vehicle is running, the hydraulic control circuit is prevented from establishing a low or intermediate speed step, so that a rotation speed of the engine of the vehicle is prevented from being so increased as to exceed an overspeed range; and if the off-fail state occurs when the vehicle is not running, the hydraulic control circuit is prevented from establishing a high speed step, so that a driving force of the engine is prevented from being so decreased as to be insufficiently low. Thus, the vehicle is allowed to run appropriately after the occurrence of the off-fail state.

According to a second aspect of the present invention, there is provided a hydraulic control circuit for an automatic transmission of a vehicle, the automatic transmission including a plurality of hydraulically operated coupling devices at least one of which is selectively operated to establish a corresponding one of a plurality of speed steps, the hydraulic control circuit comprising a plurality of electromagnetic valve devices which output respective hydraulic pressures to operate the hydraulically operated coupling devices, respectively, the plurality of electromagnetic valve devices comprising a first electromagnetic valve device which outputs the hydraulic pressure to establish at least one low or intermediate speed step of the plurality of speed steps that includes a lowest speed step of the plurality of speed steps, and a second electromagnetic valve device which outputs the hydraulic pressure to establish at least one high speed step of the plurality of speed steps that includes a highest speed step of the plurality of speed steps; a first switching valve which is switched, based on the hydraulic pressure supplied from the first electromagnetic valve device, to a first operation state to output a source hydraulic pressure to a first hydraulic passage, and is switched, based on the hydraulic pressure supplied from the second electromagnetic valve device, to a second operation state to output the source hydraulic pressure to a second hydraulic passage, and which is kept in one of the first and second operation states that is an operation state thereof at a time when the first and second electromagnetic valve devices become unable to output, because of respective fails thereof, the respective hydraulic pressures; and a second switching valve which detects an all-fail state of the electromagnetic valve devices in which none of the electromagnetic valve devices output the respective hydraulic pressures, by detecting a state in which none of (a) one of the first and second electromagnetic valve devices and (b) other electromagnetic valve devices of the plurality of electromagnetic valve devices than the first and second electromagnetic valve devices output the respective hydraulic pressures, and which is switched, upon detection of the all-fail state, to an operation state to supply the source hydraulic pressure to a first hydraulically operated coupling device of the plurality of hydraulically operated coupling devices, and supply the hydraulic pressure supplied from one of the first and second hydraulic passages that corresponds to the one of the first and second operation states in which the first switching valve is kept, to a corresponding one of a second and a third hydraulically operated coupling device of the plurality of hydraulically operated coupling devices.

In the hydraulic control circuit according to the second aspect of the present invention, the first switching valve is switched, based on the hydraulic pressure that is supplied from the first electromagnetic valve device and is used to establish at least one low or intermediate speed step including the lowest speed step, to a first operation state to output a source hydraulic pressure to a first hydraulic passage, and is switched, based on the hydraulic pressure that is supplied from the second electromagnetic valve device and is used to establish at least one high speed step including the highest speed step, to a second operation state to output the source hydraulic pressure to a second hydraulic passage, and is kept in one of the first and second operation states that is an operation state thereof at a time when the first and second electromagnetic valve devices become unable to output, because of respective fails thereof, the respective hydraulic pressures. In addition, the second switching valve detects an all-fail or off-fail state of the electromagnetic valve devices in which none of the electromagnetic valve devices output the respective hydraulic pressures, by detecting a state in which none of (a) one of the first and second electromagnetic valve devices and (b) all the other or remaining electromagnetic valve devices output the respective hydraulic pressures, and the second switching valve is switched, upon detection of the off-fail state, to an operation state thereof to supply the source hydraulic pressure to the first hydraulically operated coupling device, and supply the hydraulic pressure supplied from one of the first and second hydraulic passages that corresponds to the one of the first and second operation states in which the first switching valve is kept, to a corresponding one of the second and third hydraulically operated coupling devices. Therefore, when the off-fail state of the electromagnetic valve devices occurs, the first hydraulically operated coupling device is operated, and one of the second and third hydraulically operated coupling devices is operated by the hydraulic pressure supplied from one of the first and second hydraulic passages that corresponds to one of the first and second operation states in which the first switching valve is kept. Thus, the present hydraulic control circuit can selectively establish either one of two speed steps of the automatic transmission. For example, if the vehicle is running, when the off-fail state occurs, at a low or intermediate speed step established by the hydraulic pressure outputted from the first electromagnetic valve device, the present hydraulic control circuit may operate the first and second hydraulically operated coupling devices; and if the vehicle is running, when the off-fail state occurs, at a high speed step established by the hydraulic pressure outputted from the second electromagnetic valve device, the present hydraulic control circuit may operate the first and third hydraulically operated coupling devices. For example, if the hydraulic control circuit establishes the same, or a different, low or intermediate speed step by operating the first and second hydraulically operated coupling devices, and establishes the same, or a different, high speed step by operating the first and third hydraulically operated coupling devices, the hydraulic control circuit is prevented from establishing a low or intermediate speed step when the off-fail state occurs to the vehicle running at a high speed step, so that a rotation speed of the engine of the vehicle is prevented from being so increased as to exceed an overspeed range, and additionally the hydraulic control circuit is prevented from establishing a high speed step when the off-fail state occurs to the vehicle running at a low or intermediate speed step, so that a driving force of the engine is prevented from being so decreased as to be insufficiently low. Thus, the vehicle can run appropriately after the occurrence of the off-fail state.

According to a preferred feature of the first, or second, aspect of the present invention, a low or intermediate speed step of the plurality of speed steps is established when the first and second hydraulically operated coupling devices are operated, and a high speed step of the plurality of speed steps is established when the first and third hydraulically operated coupling devices are operated.

In the hydraulic control circuit according to the first aspect of the present invention, if the off-fail state occurs when the vehicle is running, a high speed step of the automatic transmission may be is established; and if the off-fail state occurs when the vehicle has not started running yet, a low or intermediate speed step of the automatic transmission may be established. Thus, the vehicle can run appropriately after the occurrence of the off-fail state. Likewise, in the hydraulic control circuit according to the second aspect of the present invention, if the off-fail state occurs when the vehicle is running at a high speed step, the same, or a different, high speed step may be established; and if the off-fail state occurs when the vehicle is running at a low or intermediate speed step, or has not started running yet, the same, or a different, low or intermediate speed step may be established. Thus, the vehicle can run appropriately after the occurrence of the off-fail state.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Hereinafter, there will be described preferred embodiments of the present invention by reference to the drawings.

Figures 1, 2:
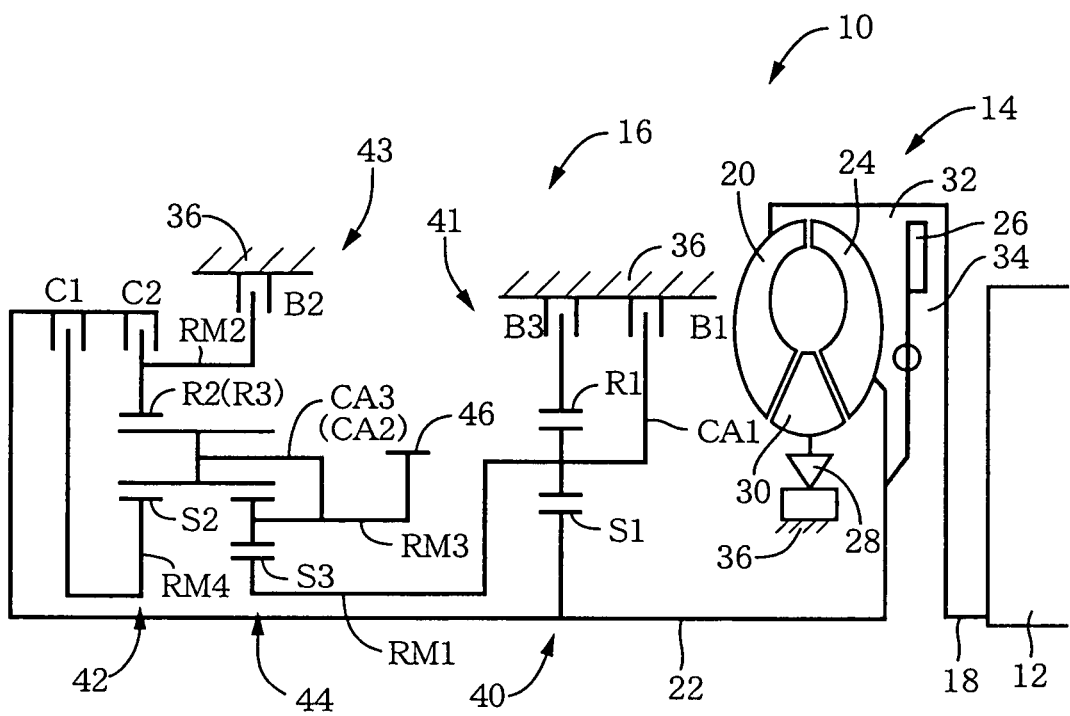
FIG. 1 is a schematic view of a power transmission system of a vehicle to which the present invention is applied.
FIG. 2 is an operation table representing a relationship between a plurality of speed steps of an automatic transmission of the power transmission system, shown in FIG. 1, and combinations of respective operating states of clutches and brakes to establish those speed steps.

FIG. 1 schematically shows a construction of a power transmission system 10 of a vehicle to which the present invention is applied. The power transmission system 10 includes a transverse automatic transmission 16, and is preferably employed by an FF (front-engine, front-drive) vehicle. The vehicle includes an engine 12, e.g., an internal combustion engine, as a driving power source which outputs a driving power to drive or run the vehicle. The driving power outputted from the engine 12 is transmitted to a left and a right driving wheel of the vehicle via a torque converter 14 as a hydraulic power transmission device, the transverse automatic transmission 16, a differential gear unit, not shown, and a pair of axle shafts.

The torque converter 14 includes a pump impeller 20 connected to a crankshaft 18 of the engine 12; a turbine impeller 24 connected to an input shaft 22 of the automatic transmission 16; and a stator impeller 30 connected to a transmission case 36 via a one-way clutch 28, and the torque converter 14 hydraulically transmits the driving power. A lockup clutch 26 is provided between the pump impeller 20 and the turbine impeller 24. The lockup clutch 26 is a sort of hydraulically operated friction clutch which is frictionally engaged by a pressure difference, ΔP, of respective hydraulic pressures of an engaging hydraulic chamber 32 and a releasing hydraulic chamber 34. When the lockup clutch 26 is fully engaged, the pump impeller 20 and the turbine impeller 24 are rotated as an integral body. The pressure difference ΔP, i.e., engaging torque is feedback controlled so that the lockup clutch 26 is engaged in a prescribed slipping state. More specifically described, when the vehicle is driven or run, that is, when the driving power is "ON", the turbine impeller 24 is rotated to follow the pump impeller 20 at a prescribed slip amount, e.g., 50 rpm; and when the vehicle is not driven, that is, when the driving power is "OFF", the pump impeller 20 is rotated to follow the turbine impeller 24 at a prescribed slip amount, e.g., −50 rpm.

The automatic transmission 16 includes a first transmission portion 41 which is essentially constituted by a single-pinion first planetary gear set 40, and a second transmission portion 42 which is essentially constituted by a single-pinion second planetary gear set 42 and a double-pinion third planetary gear set 44 and which is coaxial with the first transmission portion 41. The automatic transmission 16 transmits a rotary motion of the input shaft 22 as an input member, and outputs the rotary motion via an output gear 46 as an output member. The input shaft 22 is a turbine shaft of the torque converter 14 that is driven or rotated by the engine 12 as the driving power source of the vehicle. The output gear 46 is indirectly meshed with the differential gear unit via a counter shaft, or is directly meshed with the same, so as to drive or rotate the left and right driving wheels of the vehicle. The automatic transmission 16 has a construction which is substantially symmetrical with respect to its horizontal centerline, and a lower half portion of the same 16 is not shown in FIG. 1.

The first planetary gear set 40 constituting the first transmission portion 41 includes three rotary elements, i.e., a sun gear S1, a carrier CA1, and a ring gear R1. When the sun gear S1, connected to the input shaft 22, is driven or rotated by the same 22, and the ring gear R1 is fixed via a third brake B3 to the transmission case (i.e., housing) 36 so that the ring gear R1 is not rotatable, the carrier CA1 functions as an intermediate output member such that the carrier CA1 is rotated at a speed lower than that of the input shaft 22. The second and third planetary gear sets 42, 44 constituting the second transmission portion 43 are partially connected to each other to provide four rotary elements RM1, RM2, RM3, RM4. More specifically described, a sun gear S3 of the third planetary gear set 44 provides the first rotary element RM1; respective ring gears R2, R3 of the second and third planetary gear sets 42, 44 are connected to each other to provide the second rotary element RM2; respective carriers CA2, CA3 of the second and third planetary gear sets 42, 44 are connected to each other to provide the third rotary element RM3; and a sun gear S2 of the second planetary gear set 42 provides the fourth rotary element RM4. That is, the second and third planetary gear sets 42, 44 provide a Ravigneaux-type planetary gear train in which respective ring gears R2, R3 of the second and third planetary gear sets 42, 44 are constituted by a common member; the respective carriers CA2, CA3 of the second and third planetary gear sets 42, 44 are constituted by another common member; and the pinion gears of the first planetary gear set 42 also function as the second pinion gears of the third planetary gear set 44.

Figure 3:
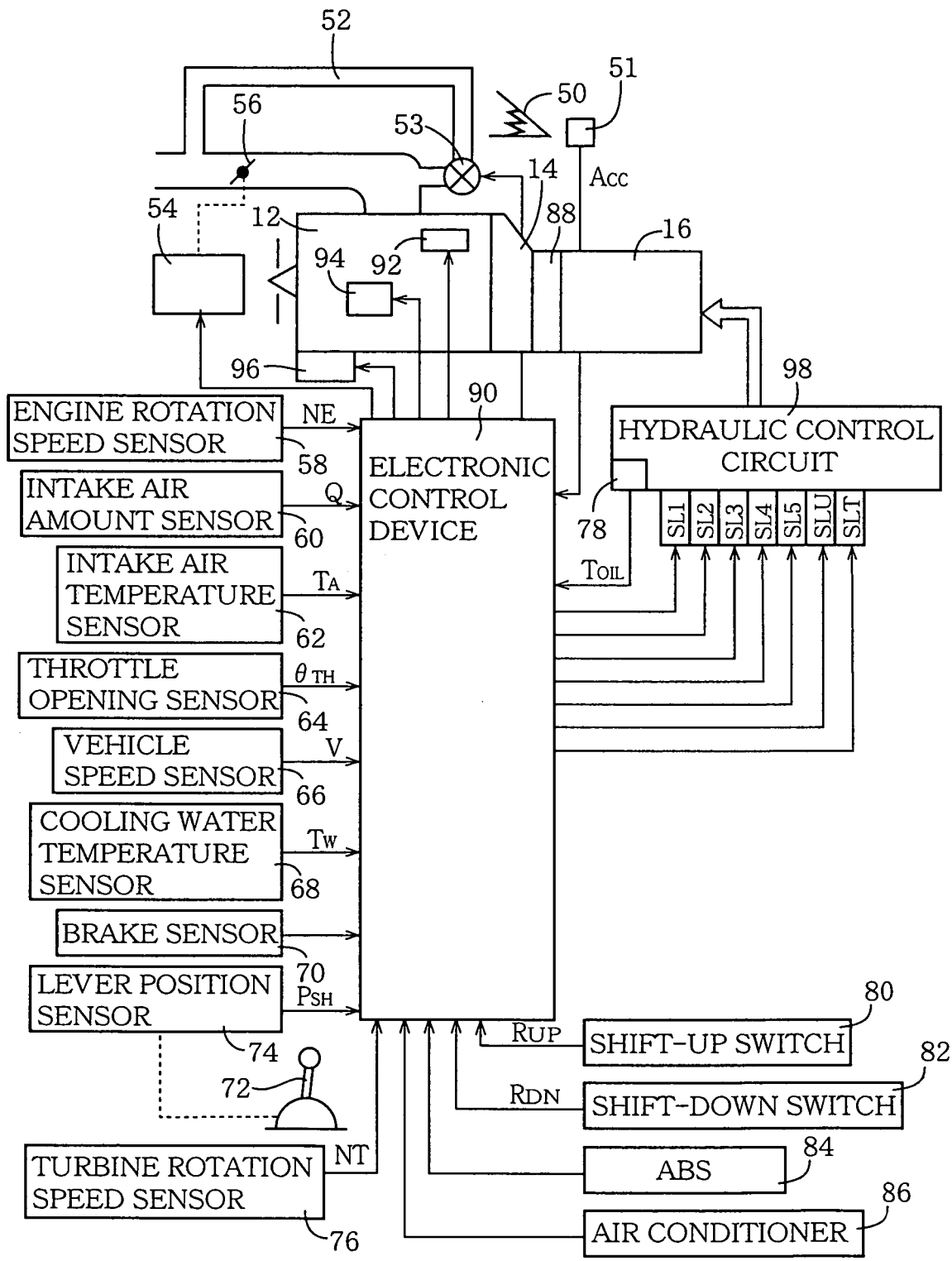
FIG. 3 is a diagrammatic view for explaining electric signals which are inputted to, and outputted from, an electronic control device of the vehicle.

The first rotary element RM1 (i.e., the sun gear S3) is selectively connected, by a first brake B1, to the transmission case 36, so that the first rotary element RM1 is stopped from rotation; the second rotary element RM2 (i.e., the ring gears R2, R3) is selectively connected, by a second brake B2, to the transmission case 36, so that the second rotary element RM2 is stopped from rotation; the fourth rotary element RM4 (i.e., the sun gear S2) is selectively connected by a first clutch C1 to the input shaft 22; the second rotary element RM2 (i.e., the ring gears R2, R3) is selectively connected by a second clutch C2 to the input shaft 22; the first rotary element RM1 (i.e., the sun gear S3) is integrally connected to the carrier CA1 of the first planetary gear set 40 that functions as the intermediate output member; and the third rotary element RM3 (i.e., the carriers CA2, CA3) is integrally connected to the output gear 46 so as to output the rotary motion. Each of the first and second clutches C1, C2 and the first, second, and third brakes B1, B2, B3 includes a plurality of friction plates, and is a hydraulically operated frictional coupling device as a sort of hydraulically operated coupling device that is engaged and disengaged, i.e., controlled, by a hydraulic actuator. More specifically described, the two clutches C (C1, C2) and the three brakes B (B1, B2, B3) are directly controlled by respective hydraulic pressures which are outputted from five solenoid operated valves SL1, SL2, SL3, SL4, SL5, each as an electromagnetic valve device, of a hydraulic control circuit 98 (FIG. 3). A hydraulic circuit including the hydraulic control circuit 98 can be switched by a manual valve, not shown, described later.

FIG. 2 shows an operation table representing a relationship between speed steps of the automatic transmission 16, and combinations of respective operating states of the clutches C1, C2 and the brakes B1 through B3 to establish those speed steps. In the operation table, symbol "O" indicates an operated or engaged state of each clutch C or brake B. Thus, in the automatic transmission 16, the three planetary gear sets 40, 42, 44, the two clutches C1, C2, and the three brakes B1, B2, B3 cooperate with each other to establish multiple speed steps, i.e., six forward speed steps and one reverse speed step. That is, the total number, two, of the clutches C employed by the automatic transmission 16 is smaller by one as compared with the case where three clutches and two brakes are employed. Therefore, a weight, a production cost, and an axial length of the automatic transmission 16 can be reduced by respective amounts corresponding to one clutch. In particular, since the single-pinion second planetary gear set 42, and the double-pinion third planetary gear set 44, of the second transmission portion 43 are constituted by the Ravigneaux-type planetary gear train, the total number of components, and the axial length, of the automatic transmission 16 can be further reduced.

The hydraulic control circuit 98, shown in FIG. 3, includes, in addition to the solenoid operated valves SL1 through SL5 for controlling the automatic transmission 16, a linear solenoid valve SLU which mainly controls a lockup hydraulic pressure, i.e., the pressure difference $\Delta P$ of the respective hydraulic pressures of the engaging hydraulic chamber 32 and the releasing hydraulic chamber 34 of the lockup clutch 26; and a linear solenoid valve SLT which mainly controls a line hydraulic pressure $P_L$ that is supplied to each portion of the hydraulic control circuit 98. A hydraulic fluid present in the hydraulic control circuit 98 is also supplied to the lockup clutch 26, and is used to lubricate each portion of the automatic transmission 16. The hydraulically operated frictional coupling devices C1, C2, B1, B2, B3 of the automatic transmission 16, and the lockup clutch 26 are controlled by the hydraulic control circuit 98 based on a source hydraulic pressure produced by an oil pump 88 which is mechanically connected to the engine 12 and is directly driven or rotated by the same 12 in synchronism with the rotation of the same 12.

FIG. 3 is a diagrammatic view of a control system employed by the vehicle to control the engine 12 and the automatic transmission 16, shown in FIG. 1. The control system includes an accelerator opening sensor 51 which detects an accelerator opening Acc as an amount of operation of an accelerator pedal 50. The accelerator pedal 50 corresponds to an accelerator operating member that is operated or depressed by a driver's foot, by an amount corresponding to his or her desired output amount; and the accelerator opening Acc corresponds to the desired output amount. In an intake pipe of the engine 12, there is provided an electronic throttle valve 56 which is opened by a throttle actuator 54, by a throttle opening $\Theta_{TH}$, i.e., a degree of opening of the valve 56 corresponding to the accelerator opening Acc. The electronic throttle valve 56 is bypassed by a bypass passage 52 so as to control an idling rotation speed $N_{EIDL}$ of the engine 12. In the bypass passage 52, there is provided an ISC (idling rotation speed control) valve 53 which controls an amount of air taken when the electronic throttle valve 56 is fully closed, so as to control the idling rotation speed $N_{EIDL}$ of the engine 12. The control system additionally includes an engine rotation speed sensor 58 which detects a rotation speed $N_E$ of the engine 12; an intake air amount sensor 60 which detects an amount Q of air taken by the engine 12; an intake air temperature sensor 62 which detects a temperature $T_A$ of the air taken by the engine 12; a throttle sensor 64 with an idling switch that detects the fully closed state of the electronic throttle valve 56 (i.e., the idling state of the engine 12) and the throttle opening $\Theta_{TH}$ of the throttle valve 56; a vehicle speed sensor 66 which detects a running speed V of the vehicle that corresponds to a rotation speed $N_{OUT}$ of the output gear 46; a cooling water temperature sensor 68 which detects a temperature $T_W$ of a cooling water to cool the engine 12; a brake switch 70 which detects whether a foot brake as a service brake is being operated or not; a lever position sensor 74 which detects an operation position $P_{SH}$ of a shift lever 72; a turbine rotation speed sensor 76 which detects a turbine rotation speed $N_T$ (i.e., a rotation speed $N_{IN}$ of the input shaft 22); an AT oil temperature sensor 78 which detects an AT oil temperature $T_{OIL}$ as a temperature of the hydraulic oil in the hydraulic control circuit 98; a shift-up switch 80 which is manually operable to input a shift-up command $R_{UP}$ to increase the speed step of the automatic transmission 16; and a shift-down switch 82 which is manually operable to input a shift-down command $R_{DN}$ to decrease the speed step of the automatic transmission 16. These sensors and switches 58, 60, 62, 64, 66, 68, 70, 74, 76, 78, 80, 82 supply, to an electronic control device 90, respective electric signals representing the engine rotation speed $N_E$, the intake air amount Q, the intake air temperature $T_A$, the throttle opening $\Theta_{TH}$, the vehicle running speed V, the engine cooling water temperature $T_W$, whether the foot brake is being operated or not, the shift position $P_{SH}$ of the shift lever 72, the turbine rotation speed $N_T$, the AT oil temperature $T_{OIL}$, the shift-up command $R_{UP}$, and the shift-down command $R_{DN}$. In addition, the control system is connected to an ABS (i.e., an anti-lock brake system) 84 which controls a braking force so that the wheels of the vehicle may not locked (i.e., slipped) upon operation of the foot brake, and is additionally connected to an air conditioner 86. The control system receives, from the ABS 84, information about, e.g. the braking hydraulic pressure corresponding to the braking force and, from the air conditioner 86, a signal representing whether the conditioner 86 is being operated or not.

The electronic control device 90 is constituted by a so-called microcomputer including a CPU (central processing unit), a RAM (random access memory), a ROM (read only memory), and an input and output interface. The CPU processes the signals according to control programs pre-stored by the ROM, while utilizing a temporary storage function of the RAM, and controls the output power of the engine 12, the changing of speed steps of the automatic transmission 16, and the operation of the lockup clutch 26. The microcomputer may include two CPUs one of which is used for the control of the engine 12 and the other of which is used for the control of the hydraulic circuit.

Figure 4:
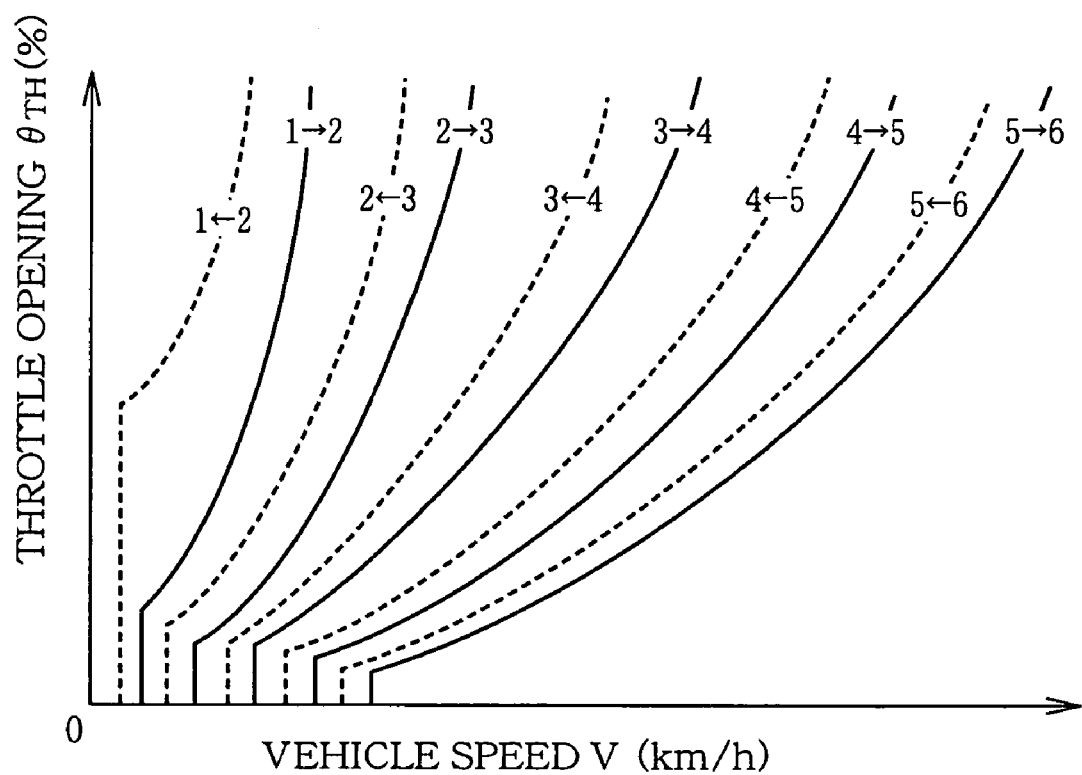
FIG. 4 is a graph showing a speed-change map which is used by the electronic control device, shown in FIG. 3, to control a speed changing operation of the automatic transmission.

The changing of speed steps of the automatic transmission 16 is controlled according to the operation position $P_{SH}$ of the shift lever 72 shown in FIG. 3, such that based on a pre-stored speed-change chart or map, shown in FIG. 4, and actual throttle opening $\Theta_{TH}$ and vehicle speed V, a new speed step to which the current speed step of the automatic transmission 16 is to be changed is determined and selected, and a speed-change command to start changing the current speed step to the determined, new speed step is outputted. The shift lever 72 is provided in the vicinity of a driver's seat, and is manually operable by a driver to one of four operation positions, i.e., "R (reverse) position", "N (neutral) position", "D (drive) position or range", and "P (parking) position". The R position is a backward running position; the N position is a power transmission stopping position; and the D position or range is a forward running position or range in which automatic changing of forward speed steps is carried out. The current operation position of the shift lever 72 is detected by the above-described lever position sensor 74. When the shift lever 72 is operated forward and backward, the manual valve, not shown, that is connected to the shift lever 72 via a cable or a link is mechanically operated and accordingly the hydraulic circuit is switched. In particular, when the current operation position $P_{SH}$ of the shift lever 72 is the D position, a D-position pressure $P_D$ derived from the line hydraulic pressure $P_L$ as a source pressure is supplied to the hydraulic control circuit 98 via the manual valve.

When the shift lever 72 is operated to the D position as the forward running position, this operation of the lever 72 causes the manual valve to switch the hydraulic circuit and thereby mechanically establish a forward running circuit, so that the vehicle is allowed to run forward while the speed steps of the automatic transmission 16 can be changed among the first to sixth speed steps, "$1^{st}$", "$2^{nd}$", "$3^{rd}$", "$4^{th}$", "$5^{th}$", "$6^{th}$", each as a forward running speed step, shown in the operation table of FIG. 2. More specifically described, when the shift lever 72 is moved to the D position, the electronic control device 90 recognizes this based on the signal supplied from the lever position sensor 74, and establishes an automatic speed-change mode in which all the forward running speed steps, i.e., the first to sixth speed steps "$1^{st}$" through "$6^{th}$" can be used to change the running speed V of the vehicle. That is, the five solenoid operated valves SL1 through SL5 are controlled to switch the hydraulic control circuit 98 and thereby establish an appropriate one of the six forward running speed steps, so that a speed-change shock caused by, e.g., a driving-force change may not occur, or durability of each frictional member may not be deteriorated. In the present embodiment, the hydraulic control circuit 98 is constructed such that the respective hydraulic pressures outputted from the solenoid operated valves SL1 through SL are directly used to control the two clutches C1, C2 and the three brakes B1, B2, B3, respectively. For example, the first speed step "$1^{st}$", shown in the operation table of FIG. 2, is established by causing the first clutch C1 and the second brake B2 to be engaged by the respective hydraulic pressures outputted from the solenoid operated valves SL1, SL4 according to a drive current, I, which is outputted from the electronic control device 90 and has a drive duty ratio, D. FIG. 4 shows a map in which shift-up lines are indicated at solid lines and shift-down lines are indicated at broken lines. As the vehicle speed V decreases or the throttle opening $\theta_{TH}$ increases, a current speed step is shifted down to a new speed step having a greater speed-change ratio {=(input rotation speed $N_{IN}$)/(output rotation speed $N_{OUT}$)}. In other words, as the vehicle speed V increases or the throttle opening $\theta_{TH}$ decreases, a current speed step is shifted up to a new speed step having a smaller speed-change ratio. In FIG. 4, numerals "1", "2", "3", "4", "5", and "6" indicate the first to sixth speed steps "$1^{st}$" through "$6^{th}$", respectively.

Figure 5:
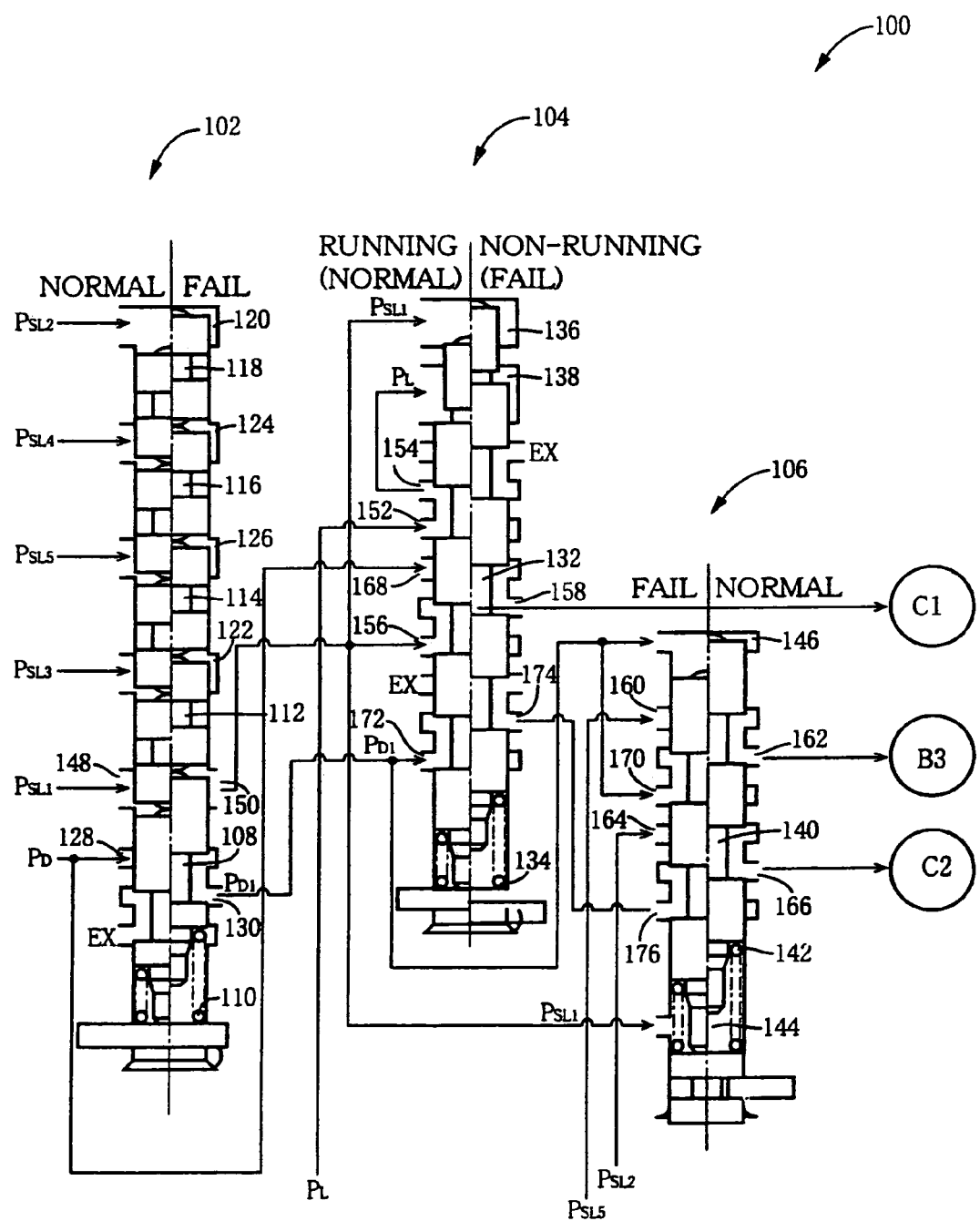
FIG. 5 is a diagrammatic view of a hydraulic control circuit as one embodiment of the present invention that is employed by the power transmission system of FIG. 1 and that establishes, when none of electromagnetic valves output respective hydraulic pressures, a pre-selected speed step and thereby enables the vehicle to run.

FIG. 5 shows a hydraulic control circuit 100 as an essential portion of the hydraulic control circuit 98, shown in FIG. 3, that provides a fail-safe function of the same 98. When the solenoid operated valves SL1 through SL5 of the hydraulic control circuit 98 fall in an "off-fail" state, i.e., an all-fail state in which no hydraulic pressures are outputted from the solenoid valves SL1–SL5, the fail-safe function or the hydraulic control circuit 100 establishes an appropriate one of a plurality of pre-selected speed steps and thereby enables the vehicle to run appropriately. The hydraulic control circuit 100 includes an all-fail detecting valve 102, an operation-state memory valve 104, and a switching valve 106. The all-fail detecting valve 102 and the switching valve 106 cooperate with each other to provide an all-fail detecting and switching valve device. In FIG. 5, symbols "$P_{SL1}$", "$P_{SL2}$", "$P_{SL3}$", "$P_{SL4}$", "$P_{SL5}$" indicate respective control pressures, $P_{SL1}$, $P_{SL2}$, $P_{SL3}$, $P_{SL4}$, $P_{SL5}$, as the respective hydraulic pressures outputted from the solenoid operated valves SL1 through SL5.

The all-fail detecting valve 102 includes a spool valve member 108; a spring 110 which is provided on a side of one of opposite axial ends of the valve member 106 and applies, to the valve member 108, a thrust to move the valve member 108 toward a "fail" position thereof, a spool valve member 112 which contacts the other axial end of the spool valve member 108 and applies, to the valve member 108, a thrust to move the valve member 108 toward a "normal" position thereof, a spool valve member 114 which contacts the spool valve member 112 and applies, to the valve member 112, a thrust to move the valve member 108 toward its normal position; a spool valve member 116 which contacts the spool valve member 114 and applies, to the valve member 114, a thrust to move the valve member 108 toward its normal position; a spool valve member 118 which contacts the spool valve member 116 and applies, to the valve member 116, a thrust to move the valve member 108 toward its normal position; and four hydraulic chambers 120, 122, 124, 126 which receive the respective control pressures $P_{SL}2$, $P_{SL}3$, $P_{SL}4$, $P_{SL}5$, so as to bias the spool valve member 108 toward its normal position.

When the solenoid operated valves SL1 through SL5 falls in the off-fail state, the all-fail detecting valve 102 cannot receive any control pressures $P_{SL1}$, $P_{SL2}$, $P_{SL3}$, $P_{SL4}$, $P_{SL5}$ from the valves SL1–SL5, and accordingly the spring 110 of the detecting valve 102 biases the spool valve member 108 toward its fail position, indicated in a right-hand half portion of the detecting valve 102 as seen in FIG. 5, so that the D-position pressure $P_D$ as the source pressure, supplied to an input port 128, is outputted as a first hydraulic pressure $P_{D1}$ from an output port 130. That is, the first hydraulic pressure $P_{D1}$ is a hydraulic pressure which is outputted in the off-fail state of the solenoid valves SL1–SL5.

The operation-state memory valve 104 is switchable between two operation states thereof, depending on whether the control pressure $P_{SL1}$ is, or was, outputted from the solenoid valve SL1, and includes a spool valve member 132; a spring 134 which is provided on a side of one of opposite axial ends of the valve member 132 and applies, to the valve member 132, a thrust to move the valve member 132 toward a "fail" position thereof as a non-running position indicating that the vehicle is not running; a hydraulic chamber 136 which is provided on a side of the other axial end of the spool valve member 132 and receives the control pressure $P_{SL1}$ so as to bias the spool valve member 132 toward a "normal" position thereof as a running position indicating that the vehicle is running; and a hydraulic chamber 138 which is provided in a vicinity of the other axial end of the spool valve member 132 and receives the line hydraulic pressure $P_L$ so as to bias the spool valve member 132 toward its normal position.

Therefore, when the control pressure $P_{SL1}$ is inputted to the hydraulic chamber 136 of the operation-state memory valve 104, the spool valve member 132 is biased toward its normal position indicated in a left-hand half portion of the memory valve 104 as seen in FIG. 5. If, in this state, the solenoid valve SL1 becomes unable to output the control pressure $P_{SL1}$, the line pressure $P_L$ supplied to an input port 152 is inputted via a bypass port 154 to a hydraulic chamber 138, so as to bias the spool valve member 132 toward its normal position. Thus, the spool valve member 132 is kept biased toward its normal position. In short, the operation-state memory valve 104 is operated such that once the control pressure $P_{SL1}$ is inputted thereto, the memory valve 104 is kept at its normal operation state corresponding to the normal position of the spool valve member 132 and, even when the solenoid valves SL1–SL5 may fall in the off-fail state, the memory valve 104 is kept at the normal operation state and thus "memorizes" the normal operation state. The control pressure $P_{SL1}$ is outputted from the solenoid valve SL1 so as to operate the first clutch C1 as one of two hydraulically operated coupling devices used to establish each one of the first to fourth speed steps (FIG. 2) corresponding to the D position. Therefore, when the vehicle is in a state in which the solenoid valves SL1–SL5 are not in the off-fail state, and when the shift lever 72 is first moved from the N position to the D position after the engine 12 is ignited "ON", i.e., started, the operation-state memory valve 104 is switched, based on the inputting thereto of the control pressure $P_{SL1}$ as one of two control pressures needed to establish the first speed step, from its fail operation state to its normal operation state. Even if the solenoid valves SL1–SL5 may fall in the off-fail state, the memory valve 104 keeps or memorizes the normal operation state, so long as the vehicle continues running thereafter, i.e., till the engine 12 is ignited "OFF", i.e., stopped. However, when the vehicle is in a state in which the solenoid valves SL1–SL5 are in the off-fail state, and when the shift lever 72 is first moved from the N position to the D position after the engine 12 is ignited ON, the control pressure $P_{SL1}$ is not inputted to the operation-state memory valve 104 and accordingly the memory valve 104 is kept in the fail operation state.

The switching valve 106 includes a spool valve member 140; a spring 142 which is provided on a side of one of opposite axial ends of the valve member 140 and applies, to the valve member 140, a thrust to move the valve member 140 toward a "normal" position thereof, a hydraulic chamber 144 which accommodates the spring 142 and receives the control pressure $P_{SL1}$ so as to bias the spool valve member 140 toward its normal position; and a hydraulic chamber 146 which is provided on a side of the other axial end of the spool valve member 140 and receives the first hydraulic pressure $P_{D1}$ so as to bias the spool valve member 140 toward a "fail" position thereof.

Therefore, when the solenoid valves SL1–SL5 fall in the off-fail state and accordingly the first hydraulic pressure $P_{D1}$ is outputted, the first hydraulic pressure $P_{D1}$ is inputted to the hydraulic chamber 146 of the control valve 106 and accordingly the spool valve member 140 is biased toward its fail position indicated in a left-hand half portion of the valve 106 as seen in FIG. 5. In short, the switching valve 106 is switchable between two operation states thereof one of which corresponds to the off-fail state of the solenoid valves SL1–SL5 and the other of which corresponds to a normal state in which the same SL1–SL5 are not in the off-fail state, whereby the switching valve 106 can control the respective control pressures $P_{SL2}$, $P_{SL5}$ supplied to the second clutch C2 and the third brake B3.

Hereinafter, there will be described the fail-safe function of the hydraulic control circuit 100, constructed as described above, that establishes, when the solenoid valves SL1–SL5 fall in the off-fail state, an appropriate one of pre-selected speed steps and thereby enables the vehicle to run, together with an example of a speed-change controlling operation that is carried out when the same SL1–SL5 are not in the off-fail state.

The fail-safe function of the hydraulic control circuit 100, shown in FIG. 5, is one embodiment for establishing, when the solenoid valves SL1–SL5 fall in the off-fail state, two different speed steps including the third speed step as one of the low and intermediate speed steps, i.e., the first to fourth speed steps, and the fifth speed step as one of the high speed steps, i.e., the fifth and sixth speed steps. That is, the hydraulic control circuit 100 has a construction for establishing the third speed step by operating the first clutch C1 and the third brake B3, and establishing the fifth speed step by operating the second clutch C2 and the third brake B3, each according to the operation table shown in FIG. 2. In the present embodiment, the third brake B3 corresponds to a first hydraulically operated coupling device; the first clutch C1 corresponds to a second hydraulically operated coupling device; and the second clutch C2 corresponds to a third hydraulically operated coupling device.

In a normal-state speed-change controlling operation, the third speed step is established by operating the solenoid valves SL1, SL5 to output the respective control pressures $P_{SL}1$, $P_{SL}5$ to control the first clutch C1 and the third brake B3. When the control pressures $P_{SL}1$, $P_{SL}5$ are inputted to the all-fail detecting valve 102, the spool valve member 108 is biased toward its normal position indicated in the left-hand half portion of the detecting valve 102 as seen in FIG. 5, so that the input port 128 is closed and accordingly the first hydraulic pressure $P_D1$ is not outputted from the output port 130, but the control pressure $P_{SL}1$ inputted to an input port 148 is outputted from an output port 150. As described above, when the control pressure $P_{SL}1$ is outputted, the operation-state memory valve 104 is switched to, and kept in, the normal operation state. The control pressure $P_{SL}1$ outputted from the output port 150 is inputted to an input port 156 of the memory valve 104, and is supplied from a supply port 158 to the first clutch C1, so that the first clutch C1 is operated or engaged. Simultaneously, the control pressure $P_{SL}5$ inputted to an input port 160 of the switching valve 106, kept in its normal operation state, is supplied from a supply port 162 to the third brake B3, so that the third brake B3 is operated or engaged. Thus, the third speed step is established.

In the normal-state speed-change controlling operation, the fifth speed step is established by operating the solenoid valves SL2, SL5 to output the respective control pressures $P_{SL2}$, $P_{SL5}$ to control the second clutch C2 and the third brake B3. When the control pressure $P_{SL5}$ is inputted to the input port 160 of the control valve 160, kept in its normal operation state, and is supplied from the supply port 162 to the third brake B3, the third brake B3 is engaged. Simultaneously, the control pressure $P_{SL2}$ is inputted to an input port 164 of the control valve 106, and is supplied from a supply port 166 to the second clutch C2, so that the second clutch C2 is engaged. Thus, the fifth speed step is established.

Next, there will be described the operation of the hydraulic control circuit 100 that corresponds to the fail-safe function thereof, i.e., is carried out when the solenoid valves SL1–SL5 are in the off-fail state. This operation depends on the current state of the vehicle at the time when the off-fail state occurs. In the present embodiment, the time when the off-fail state occurs is sorted to a first time when the shift lever 72 is moved from the N position to the D position after the engine 12 is ignited ON, or before the engine 12 is ignited ON, and a second time when the vehicle is running. First, at the first time when the shift lever 72 is moved from the N position to the D position after the engine 12 is ignited ON, or before the engine 12 is ignited ON, the all-fail detecting valve 102, the operation-state memory valve 104, and the switching valve 106 are all kept in the respective fail operation states, as described above. Therefore, the D-position pressure $P_D$ as the source pressure inputted to an input port 168 of the operation-state memory valve 104 is supplied from the supply port 158 to the first clutch C1, so that the first clutch C1 is engaged. Simultaneously, the first hydraulic pressure $P_{D1}$ outputted from the output port 130 is inputted to an input port 170 of the control valve 106, and is supplied from the supply port 162 to the third brake B3, so that the third brake B3 is engaged. Thus, the third speed step is established, and the vehicle is allowed to start running. Since the third speed step is one of the low and intermediate speed steps out of the six speed steps, the third speed step provides a greater driving force than the high speed steps do, so that the vehicle is allowed to start running more quickly.

Next, at the second time when the vehicle is running, the all-fail detecting valve 102 and the switching valve 106 are kept in the respective fail operation states, but the operation-state memory valve 104 is kept in the normal operation state because the vehicle has normally run at least once. Therefore, the first hydraulic pressure $P_{D1}$ outputted from the output port 130 is inputted to an input port 172 of the operation-state memory valve 104, is outputted from an output port 174, is inputted to an input port 176 of the switching valve 106, and is supplied from the supply port 166 to the second clutch C2, so that the second clutch C2 is engaged. Simultaneously, the first hydraulic pressure $P_{D1}$ is inputted to the input port 170 of the control valve 106, and is supplied from the supply port 162 to the third brake B3, so that the third brake B3 is engaged. Thus, the fifth speed step is established, and the vehicle is allowed to continue running. Since the fifth speed step is one of the high speed steps out of the six speed steps, the fifth speed step allows the vehicle to continue more quickly to run at a high speed, than the low and intermediate speed steps do, while the engine rotation speed $N_E$ is transmitted without being so increased as to exceed an overspeed range.

Thus, the three valves of the hydraulic control circuit 100, i.e., the all-fail detecting valve 102, the operation-state memory valve 104, and the switching valve 106 cooperate with each other to provide the fail-safe function to deal with the off-fail state of the solenoid valves SL1–SL5. The fail-safe function establishes each one of the two speed steps (i.e., the third and fifth speed steps) each as a pre-selected speed step. More specifically described, when the off-fail state occurs before the vehicle starts running, a low or intermediate speed step is established; and when the off-fail state occurs when the vehicle is running, a high speed step is established. Thus, the vehicle is appropriately enabled to start running, or to continue running.

Figure 6:
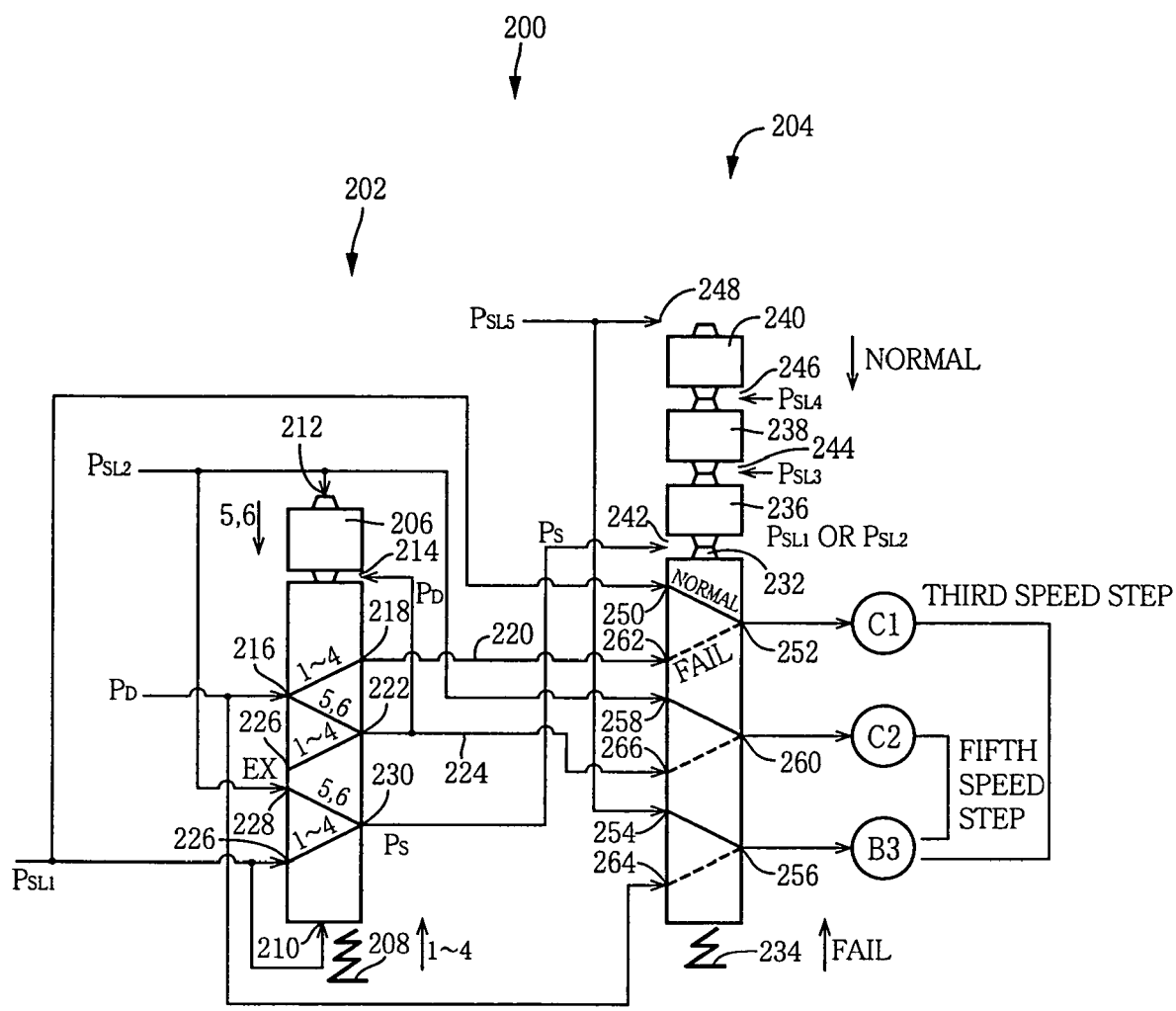
FIG. 6 is a diagrammatic view of another hydraulic control circuit as another embodiment of the present invention that may be employed, by the power transmission system of FIG. 1, in place of the hydraulic control circuit of FIG. 5.

FIG. 6 shows another hydraulic control circuit 200 as another embodiment of the present invention that may be employed in place of the hydraulic control circuit 100 shown in FIG. 5. The same reference numerals as used in the first embodiment shown in FIG. 5 are used to designate the corresponding elements of the second embodiment shown in FIG. 6, and the description of those elements are omitted from the following description of the second embodiment.

The hydraulic control circuit 200 shown in FIG. 6 includes a first switching valve 202 and a second switching valve 204, and significantly differs from the hydraulic control circuit 100 in that the hydraulic control circuit 200 consists of two valves, i.e., the first and second switching valves 202, 204, and in that the time when the fail-off state of the solenoid valves SL1–SL5 occurs is sorted to a first time when the vehicle is running at a low or intermediate speed step, and a second time when the vehicle is running at a high speed step.

The first control valve 202 includes a spool valve member 206; a spring 208 which is provided on a side of one of opposite axial ends of the spool valve member 206 and which applies, to the spool valve member 206, a thrust to move the same 206 toward a position, indicated at "1–4", that corresponds to the first to fourth speed steps of the automatic transmission 16; a hydraulic chamber 210 which accommodates the spring 208 and which receives the control pressure $P_{SL1}$ to bias the spool valve member 206 toward the "1–4" position; a hydraulic chamber 212 which is provided on a side of the other axial end of the spool valve member 206 and which receives the control pressure $P_{SL2}$ to bias the spool valve member 206 toward a position, indicated at "5, 6", that corresponds to the fifth and sixth speed steps of the automatic transmission 16; and a hydraulic chamber 214 which is provided in a vicinity of the other axial end of the spool valve member 206 and which receives the D-position pressure PD as the source pressure to bias the spool valve member 206 toward the "5, 6" position.

Here, the control pressure $P_{SL1}$ outputted from the solenoid valve SL1 as a first electromagnetic valve device is for operating the first clutch C1 as one of two hydraulically operated coupling devices used to establish each one of the fist to fourth speed steps as the low and intermediate speed steps, including the first speed step as the lowest speed step, that correspond to the D position, as shown in the operation table of FIG. 2; and the control pressure $P_{SL2}$ outputted from the solenoid valve SL2 as a second electromagnetic valve device is for operating the second clutch C2 as one of two hydraulically operated coupling devices used to establish each one of the fourth speed step, and the fifth and sixth speed steps as the high speed steps, including the sixth speed step as the highest speed step, that correspond to the D position, as shown in the operation table of FIG. 2.

Therefore, when the vehicle is running at one of the first to fourth speed steps each corresponding to the D position, the first switching valve 202 is switched, by the control pressure $P_{SL1}$, to an operation state thereof corresponding to the "1–4" position of the spool valve member 206, so that the D-position pressure $P_D$ as the source pressure, supplied to an input port 216, is outputted from an output port 202 to a first hydraulic passage 220. In particular, when the vehicle is running at the fourth speed step, not only the control pressure $P_{SL1}$ but also the control pressure $P_{SL2}$ are inputted to the first control valve 202. However, the first control valve 202 is switched, by the spring 208, to its operation state corresponding to the "1–4" position. In this operation state of the first switching valve 202, even if the off-fail state of the solenoid valves SL1–SL5 occurs, the first switching valve 202 is kept, by the spring 208, in its operation state corresponding to the "1–4" position. Thus, the "1–4" position is memorized by the first switching valve 202. In short, even if the off-fail state of the solenoid valves SL1–SL5 may occur when the vehicle is running at one of the first to fourth speed steps corresponding to the D position, the first control valve 202 is kept in its operation state corresponding to the "1–4" position.

In addition, when the vehicle is running at one of the fifth and sixth speed steps each corresponding to the D position, the first control valve 202 is switched, by the control pressure $P_{SL2}$, to an operation state thereof corresponding to the "5, 6" position of the spool valve member 206, so that the D-position pressure $P_D$ as the source pressure, supplied to the input port 216, is outputted from an output port 222 to a second hydraulic passage 224, and is additionally inputted to the hydraulic chamber 214. Thus, the first control valve 202 is kept in its operation state corresponding to the "5, 6" position. Thus, the "5, 6" position is memorized by the first control valve 202. The "5, 6" position is kept till the D-position pressure $P_D$ inputted to the hydraulic chamber 214 is drained from a discharge port 226, that is, till the control pressure $P_{SL1}$ is inputted to the first control valve 202 and the same 202 is switched to its operation state corresponding to the "1–4" position, or till the engine 12 is ignited OFF, i.e., stopped. Thus, even if the off-fail state of the solenoid valves SL1–SL5 may occur when the vehicle is running at one of the fifth and sixth speed steps corresponding to the D position, the first control valve 202 is kept in its operation state corresponding to the "5, 6" position.

The first switching valve 202 outputs one of the control pressure $P_{SL1}$ inputted to the input port 226 and the control pressure $P_{SL2}$ inputted to an input port 228 that corresponds to the current one of its two operation states, as a signal pressure $P_S$ from an output port 230. More specifically described, when the vehicle is running at one of the first to fourth speed steps corresponding to the D position, the first control valve 202 outputs the control pressure $P_{SL1}$ as the signal pressure $P_S$; and when the vehicle is running at one of the fifth and sixth speed steps corresponding to the D position, the first control valve 202 outputs the control pressure $P_{SL2}$ as the signal pressure $P_S$. As shown in the operation table of FIG. 2, when one of the first to sixth speed steps is established, one of the first and second clutches C1, C2 needs to be operated and accordingly one of the control pressures $P_{SL1}$, $P_{SL2}$ needs to be outputted. Therefore, the off-fail state in which none of the solenoid valves SL1–SL5 output the respective control pressures $P_{SL1}$–$P_{SL5}$ can be identified, as far as the control pressures $P_{SL1}$, $P_{SL2}$ are concerned, based on only the signal pressure $P_S$ as an output pressure of either one of the control pressures $P_{SL1}$, $P_{SL2}$. Thus, the off-fail state of the solenoid valves SL1–SL5 can be identified by finding that none of the signal pressure $P_S$ and the other control pressures $P_{SL3}$–$P_{SL5}$ are outputted.

The second switching valve 204 includes a spool valve member 232; a spring 234 which is provided on a side of one of opposite axial ends of the spool valve member 232 and which applies, to the spool valve member 232, a thrust to move the same 232 toward a position indicated at "fail"; a spool valve member 236 which contacts the other axial end of the spool valve member 232 and which applies, to the spool valve member 232, a thrust to move the same 232 toward a position indicated at "normal"; a spool valve member 238 which contacts the spool valve member 236 and applies, to the same 236, a thrust to move the spool valve member 232 toward its normal position; a spool valve member 240 which contacts the spool valve member 238 and which applies, to the spool valve member 238, a thrust to move the spool valve member 232 toward its normal position; and four hydraulic chambers 242, 244, 246, 248 which receive the signal pressure $P_S$ and the three control pressures $P_{SL3}$, $P_{SL4}$, $P_{SL5}$, respectively, so as to bias the spool valve member 232 toward its normal position.

Therefore, when the second control valve 204 does not receive any of the signal pressure $P_S$ and the three control pressures $P_{SL3}$–$P_{SL5}$, the second control valve 204 is switched to an operation state thereof corresponding to the fail position of the spool valve member 232. This means that the second control valve 204 can detect the off-fail state of the solenoid valves SL1–SL5, in substantially the same manner as the manner in which the all-fail detecting valve 102 of the hydraulic control circuit 100 can do. Since the total number of the spool valve members employed by the second control valve 204 is smaller by one than that of the all-fail detecting valve 102, the second control valve 204 as a whole can be shortened and accordingly can be provided in a reduced space.

Hereinafter, there will be described the fail-safe function of the hydraulic control circuit 200, constructed as described above, that establishes, when the solenoid valves SL1–SL5 fall in the off-fail state, appropriate speed steps and thereby enables the vehicle to continue running, together with an example of a speed-change controlling operation that is carried out when the same SL1–SL5 are not in the off-fail state.

The fail-safe function of the hydraulic control circuit 200, shown in FIG. 6, is one embodiment for establishing, when the solenoid valves SL1–SL5 fall in the off-fail state, two different speed steps including the third speed step as one of the low and intermediate speed steps, and the fifth speed step as one of the high speed steps. That is, the hydraulic control circuit 200 has a construction for establishing the third speed step by operating the first clutch C1 and the third brake B3, and establishing the fifth speed step by operating the second clutch C2 and the third brake B3, each according to the operation table shown in FIG. 2. In the present embodiment, too, the third brake B3 corresponds to the first hydraulically operated coupling device; the first clutch C1 corresponds to the second hydraulically operated coupling device; and the second clutch C2 corresponds to the third hydraulically operated coupling device.

In a normal-state speed-change controlling operation, the third speed step is established by operating the solenoid valves SL1, SL5 to output the respective control pressures $P_{SL1}$, $P_{SL5}$ to control the first clutch C1 and the third brake B3. The control pressure $P_{SL1}$ is inputted to an input port 250 of the second control valve 204 being kept in its operation state corresponding to the normal position of the spool valve member 32, and is supplied from a supply port 252 to the first clutch C1, so that the first clutch C1 is operated or engaged. Simultaneously, the control pressure $P_{SL5}$ inputted to an input port 254 of the control valve 204 is supplied from a supply port 256 to the third brake B3, so that the third brake B3 is operated or engaged. Thus, the third speed step is established.

In the normal-state speed-change controlling operation, the fifth speed step is established by operating the solenoid valves SL2, SL5 to output the respective control pressures $P_{SL2}$, $P_{SL5}$ to control the second clutch C2 and the third brake B3. When the control pressure $P_{SL2}$ is inputted to an input port 258 of the second control valve 204, kept in its operation state corresponding to the normal position, and is supplied from a supply port 260 to the second clutch C2, the second clutch C2 is engaged. Simultaneously, the control pressure $P_{SL5}$ is inputted to an input port 254 of the second control valve 204, and is supplied from a supply port 256 to the third brake B3, so that the third brake B3 is engaged. Thus, the fifth speed step is established.

Next, there will be described the operation of the hydraulic control circuit 200 that corresponds to the fail-safe function thereof, i.e., is carried out when the solenoid valves SL1–SL5 fall in the off-fail state. This operation depends on the current state of the vehicle at the time when the off-fail state occurs. In the present embodiment, the time when the off-fail state occurs is sorted to a first time when the vehicle is running at a low or intermediate speed step, and a second time when the vehicle is running at a high speed step. First, at the first time when the vehicle is running at a low or intermediate speed step, the first control valve 202 is kept in its operation state corresponding to the "1–4" position, and the second control valve 204 is kept in its operation state corresponding to the fail position, as described above. Therefore, the D-position pressure $P_D$ as the source pressure, inputted to the input port 216 of the first control valve 202, is outputted from the output port 218, and is inputted via the first hydraulic passage 220 to an input port 262 of the second control valve 204, kept in its operation state corresponding to the fail position. Then, the D-position pressure $P_D$ is supplied from the supply port 252 to the first clutch C1, so that the first clutch C1 is engaged. Simultaneously, the D-position pressure $P_D$, inputted to an input port 264 of the second control valve 204, is supplied from the supply port 256 to the third brake B3, so that the third brake B3 is engaged. Thus, the third speed step is established, and the vehicle is allowed to continue running. Since the low or intermediate speed step is shifted to the third speed step, this shifting can be quickly finished without lowering the driving force of the vehicle, and accordingly the vehicle can easily continue running.

When the engine 12 is ignited OFF, i.e., is stopped, the first control valve 202 is switched to its operation state corresponding to the "1–4" position, as described above. Therefore, if the off-fail state of the solenoid valves SL1–SL5 occurs when the operation position of the shift lever 72 is changed from the N position to the D position after the engine 12 is ignited ON, i.e., started, or before the engine 12 is ignited ON, the third speed step is established like at the first time when the vehicle is running at a low or intermediate speed step. Thus, the vehicle is allowed to start running. Since the third speed step is one of the low and intermediate speed steps out of the six speed steps, the third speed step provides a greater driving force than the high speed steps does, and accordingly the vehicle can start running more quickly.

Next, at the second time when the vehicle is running at a high speed step, the first control valve 202 is kept in its operation state corresponding to the "5, 6" position, and the second control valve 204 is kept in its operation state corresponding to the fail position, as described above. Therefore, the D-position pressure $P_D$, inputted to the input port 216 of the first control valve 202, is outputted from the output port 222, and is inputted via the second hydraulic passage 224 to an input port 266 of the second control valve 204, kept in its operation state corresponding to the fail position. Then, the D-position pressure $P_D$ is supplied from the supply port 260 to the second clutch C2, so that the second clutch C2 is engaged. Simultaneously, the D-position pressure $P_D$, inputted to the input port 264 of the second control valve 204, is supplied from the supply port 256 to the third brake B3, so that the third brake B3 is engaged. Thus, the fifth speed step is established, and the vehicle is allowed to continue running. Since the high speed step is shifted to the fifth speed step, the vehicle is allowed to continue more quickly to run at a high speed, than the low and intermediate speed steps do, while the engine rotation speed $N_E$ is transmitted without so increased as to exceed an overspeed range.

Thus, the two valves of the hydraulic control circuit 200, i.e., the first and second switching valves 202, 204 cooperate with each other to provide the fail-safe function to deal with the off-fail state of the solenoid valves SL1–SL5. The fail-safe function establishes each one of the two speed steps (i.e., the third and fifth speed steps) each as a pre-selected speed step. More specifically described, if the off-fail state occurs before the vehicle starts running or when the vehicle is running at a low or intermediate speed step, the same, or a different, low or intermediate speed step is established; and if the off-fail state occurs when the vehicle is running at a high speed step, the same, or a different, high speed step is established. Thus, the vehicle is appropriately enabled to start running, or to continue running. In addition, since the hydraulic control circuit 200 enjoys substantially the same fail-safe function as that of the hydraulic control circuit 100, by employing the smaller number of valves (i.e., the two valves 202, 204) than the valves (i.e., the three valves 102, 104, 106) of the hydraulic control circuit 100. Thus, the hydraulic control circuit 200 can be provided in a reduced space.

As is apparent from the foregoing description of the first embodiment shown in FIG. 5, when the all-fail detecting and switching valve device (i.e., the all-fail detecting valve 102 and the switching valve 106) detects the all-fail or off-fail state of the electromagnetic valve devices (SL1 through SL5) in which none of the electromagnetic valve devices output the respective hydraulic pressures (i.e., the respective control pressures $P_{SL1}$ through $P_{SL5}$), the all-fail detecting and switching valve device is switched to an operation state thereof corresponding to the fail position to output the source hydraulic pressure (i.e., the D-position pressure $P_D$) as the first hydraulic pressure $P_{D1}$ to the first hydraulically operated coupling device (i.e., the third brake B3), so that the first hydraulically operated coupling device is operated. In addition, the operation-state memory valve 104 is switched, based on a state of the vehicle before the all-fail or off-fail state of the electromagnetic valve devices occurs, from the non-running position indicating that the vehicle is not running, to the running position indicating that the vehicle is running, and is kept at one of the non-running position and the running position. More specifically described, if the vehicle is not running (before the engine 12 of the vehicle is ignited on, i.e., is started) when the off-fail state of the electromagnetic valve devices occurs, then the operation-state memory valve 104 is kept at the non-running position that is an operation state thereof at the time when the off-fail state occurs; and if the vehicle is running when the off-fail state occurs, then the operation-state memory valve 106 is kept at the running position that is an operation state thereof at the time when the off-fail state occurs. Thus, the operation-state memory valve 104 selectively supplies the operating hydraulic pressure to one of the second and third hydraulically operated coupling devices (i.e., the first and second clutches C1, C2) that corresponds to the one of the non-running and running positions at which the operation-state memory valve 104 is kept, so that the one of the second and third hydraulically operated coupling devices is selectively operated. Therefore, based on the non-running, or running, state of the vehicle when the off-fail state of the electromagnetic valve devices occurs, the hydraulic control circuit 100 can selectively establish a corresponding one of two speed steps of the automatic transmission 16, by operating the first hydraulically operated coupling device and a corresponding one of the second and third hydraulically operated coupling devices. For example, if the vehicle has not started running yet when the off-fail state occurs, the hydraulic control circuit 100 may establish a low or intermediate speed step of the automatic transmission 16, by operating the first and second hydraulically operated coupling devices; and if the vehicle is running when the off-fail state occurs, the hydraulic control circuit 100 may establish a high speed step of the automatic transmission 16, by operating the first and third hydraulically operated coupling devices. In this case, if the off-fail state occurs when the vehicle is running, the hydraulic control circuit 100 is prevented from establishing a low or intermediate speed step, so that a rotation speed of the engine 12 of the vehicle is prevented from being so increased as to exceed an overspeed range; and if the off-fail state occurs when the vehicle has not started running yet, the hydraulic control circuit 100 is prevented from establishing a high speed step, so that a driving force of the engine 12 is prevented from being so decreased as to be unable to start the vehicle. Thus, the vehicle can run appropriately after the occurrence of the off-fail state.

In addition, in the first embodiment shown in FIG. 5, the all-fail detecting and switching valve device includes the all-fail detecting valve 102 and the switching valve 106 and, when the off-fail state of the electromagnetic valve devices (SL1 through SL5) in which none of the electromagnetic valve devices output the respective hydraulic pressures (i.e., the respective control pressures $P_{SL1}$ through $P_{SL5}$) occurs, the all-fail detecting valve 102 outputs the first hydraulic pressure $P_{D1}$ to each of the operation-state memory valve 104 and the switching valve 106, and the switching valve 106 supplies, when the first hydraulic pressure $P_{D1}$ is inputted thereto, the first hydraulic pressure $P_{D1}$ to the first hydraulically operated coupling device (i.e., the third brake B3), and the operation-state memory valve 104 supplies one of the source hydraulic pressure (i.e., the D-position pressure $P_D$) and the first hydraulic pressure $P_{D1}$ that corresponds to one of the non-running position and the running position at which the operation-state memory valve 104 is kept, to a corresponding one of the second and third hydraulically operated coupling devices (i.e., the first and second clutches C1, C2). That is, when the off-fail state occurs, the first and second hydraulically operated coupling devices, or the first and third hydraulically operated coupling devices are operated based on one of the non-running position and the running position at which the operation-state memory valve 104 is kept. Thus, the hydraulic control circuit 100 can establish either one of two speed steps of the automatic transmission 16. For example, if the vehicle has not started running yet when the off-fail state occurs, the hydraulic control circuit 100 may establish a low or intermediate speed step of the automatic transmission 16, by operating the first and second hydraulically operated coupling devices; and if the vehicle is running when the off-fail state occurs, the hydraulic control circuit 100 may establish a high speed step of the automatic transmission 16, by operating the first and third hydraulically operated coupling devices. In this case, if the off-fail state occurs when the vehicle is running, the hydraulic control circuit 100 is prevented from establishing a low or intermediate speed step, so that a rotation speed of the engine 12 of the vehicle is prevented from being so increased as to exceed an overspeed range; and if the off-fail state occurs when the vehicle has not started running yet, the hydraulic control circuit 100 is prevented from establishing a high speed step, so that a driving force of the engine 12 is prevented from being so decreased as to be unable to start the vehicle. Thus, the vehicle can run appropriately after the occurrence of the off-fail state.

As is apparent from the foregoing description of the second embodiment shown in FIG. 6, the first switching valve 202 is switched, based on the hydraulic pressure $P_{SL1}$, supplied from the first electromagnetic valve device PL1, that is used to establish each of the first to fourth speed steps each as a low or intermediate speed step, including the lowest speed step (i.e., the first speed step), to a first operation state to output the source hydraulic pressure (i.e., the D-position pressure $P_D$) to the first hydraulic passage 220, and is switched, based on the hydraulic pressure $P_{SL2}$, supplied from the second electromagnetic valve device PL2, that is used to establish each of the fifth and sixth speed steps each as a high speed step, including the highest speed step (i.e., the sixth speed step), to a second operation state to output the source hydraulic pressure $P_D$ to the second hydraulic passage 224, and is kept in one of the first and second operation states that is an operation state thereof at the time when the first and second electromagnetic valve devices PL1, PL2 become unable to output, because of respective fails thereof, the respective hydraulic pressures $P_{SL1}$, $P_{SL2}$. In addition, the second switching valve 204 detects the all-fail or off-fail state of the electromagnetic valve devices SL1 through SL5 in which none of the electromagnetic valve devices output the respective hydraulic pressures $P_{SL1}$ through $P_{SL5}$, by detecting a state in which none of (a) one of the first and second electromagnetic valve devices SL1, SL2 and (b) the other electromagnetic valve devices SL3 through SL5 output the respective hydraulic pressures $P_{SL1}$ through $P_{SL5}$, and the second switching valve 204 is switched, upon detection of the off-fail state, to an operation state thereof to supply the source hydraulic pressure $P_D$ to the first hydraulically operated coupling device (i.e., the third brake B3), and supply the hydraulic pressure supplied from one of the first and second hydraulic passages 220, 224 that corresponds to the one of the first and second operation states in which the first switching valve 202 is kept, to a corresponding one of the second and third hydraulically operated coupling devices (i.e., the first and second clutches C1, C2). Therefore, when the off-fail state of the electromagnetic valve devices occurs, the first hydraulically operated coupling device is operated, and one of the second and third hydraulically operated coupling devices is operated by the hydraulic pressure supplied from one of the first and second hydraulic passages 220, 224 that corresponds to one of the first and second operation states in which the first switching valve 202 is kept. Thus, the hydraulic control circuit 200 can selectively establish either one of two speed steps of the automatic transmission 16. For example, if the vehicle is running, when the off-fail state occurs, at a low or intermediate speed step established by the hydraulic pressure outputted from the first electromagnetic valve device, the hydraulic control circuit 200 may operate the first and second hydraulically operated coupling devices; and if the vehicle is running, when the off-fail state occurs, at a high speed step established by the hydraulic pressure outputted from the second electromagnetic valve device, the hydraulic control circuit 200 may operate the first and third hydraulically operated coupling devices. For example, if the hydraulic control circuit 200 establishes the same, or a different, low or intermediate speed step by operating the first and second hydraulically operated coupling devices, and establishes the same, or a different, high speed step by operating the first and third hydraulically operated coupling devices, the hydraulic control circuit 200 is prevented from establishing a low or intermediate speed step when the off-fail state occurs to the vehicle running at a high speed step, so that the rotation speed $N_E$ of the engine 12 of the vehicle is prevented from being so increased as to exceed an overspeed range, and additionally the hydraulic control circuit 200 is prevented from establishing a high speed step when the off-fail state occurs to the vehicle running at a low or intermediate speed step, so that the driving force of the engine 12 is prevented from being so decreased as to be insufficiently low. Thus, the vehicle can run appropriately after the occurrence of the off-fail state.

In each of the first and second embodiments shown in FIGS. 5 and 6, a low or intermediate speed step, e.g., the third speed step is established when the first and second hydraulically operated coupling devices (i.e., the third brake B3 and the first clutch C1) are operated, and a high speed step, e.g., the fifth speed step is established when the first and third hydraulically operated coupling devices (i.e., the third brake B3 and the second clutch C2) are operated. Thus, in the first embodiment shown in FIG. 5, if the off-fail state occurs when the vehicle is running, a high speed step of the automatic transmission 16 may be established; and if the off-fail state occurs when the vehicle has not started running yet, a low or intermediate speed step of the automatic transmission 16 may be established. Likewise, in the second embodiment shown in FIG. 6, if the off-fail state occurs when the vehicle is running at a high speed step, the same, or a different, high speed step may be established; and if the off-fail state occurs when the vehicle is running at a low or intermediate speed step, or has not started running yet, the same, or a different, low or intermediate speed step may be established. Thus, the vehicle can run appropriately after the occurrence of the off-fail state.

Figure 7A:
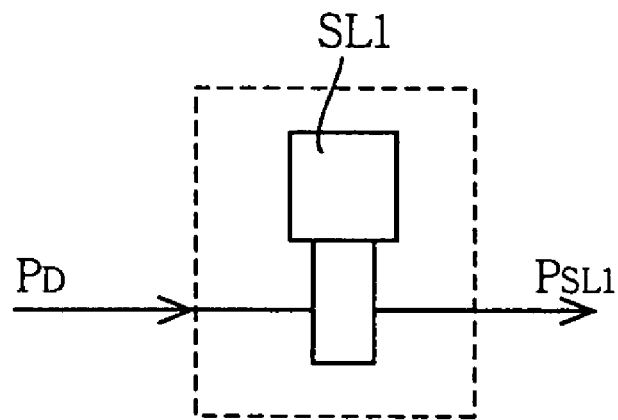
FIG. 7A is a view of an electromagnetic valve as one embodiment of each of a plurality of electromagnetic valve devices that may be employed by each of the hydraulic control circuits shown in FIGS. 5 and 6.
Figure 7B:
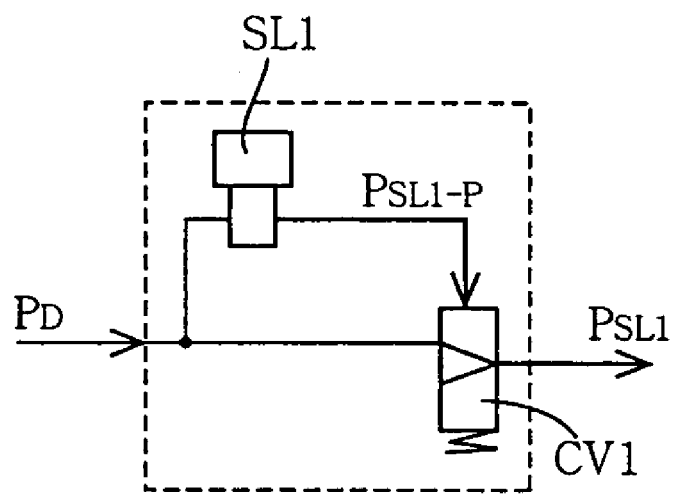
FIG. 7B is a view of a combination of an electromagnetic valve and a pressure control valve as another embodiment of each of the electromagnetic valve devices.

Meanwhile, in each of the hydraulic control circuit 100 and the hydraulic control circuit 200, the five control pressures $P_{SL1}$ through $P_{SL5}$ are the respective hydraulic pressures which are directly outputted from the five solenoid valves SL1 through SL5 functioning as a plurality of electromagnetic valve devices, as shown in FIG. 7A. However, the electromagnetic valve devices may include, in addition to the five solenoid valves SL1–SL5, five pressure control valve CV1, CV2, CV3, CV4, CV5 that are associated with the five solenoid valves SL1–SL5, respectively, as shown in FIG. 7B. Although FIG. 7A show only the solenoid valve SL1 as a representative of all the solenoid valves SL1–SL5 as the electromagnetic valve devices, and FIG. 7B shows only the combination of the solenoid valve SL1 and the pressure control valve CV1 as a representative of all the combinations of the solenoid valves SL1–SL5 and the pressure control valves CV1–CV5 as the electromagnetic valve devices, all the solenoid valves SL1–SL5 as the electromagnetic valve devices have an identical construction, and all the combinations of the solenoid valves SL1–SL5 and the pressure control valves CV1–CV5 as the electromagnetic valve devices have an identical construction. In the latter case, shown in FIG. 7B, the control pressures $P_{SL1}$–$P_{SL5}$ may be respective hydraulic pressures which are outputted by the pressure control valve CV1–CV5 by controlling or adjusting a source pressure, e.g., the D-position pressure $P_D$ based on respective pilot pressures $P_{SL1-P}$, $P_{SL2-P}$, $P_{SL3-P}$, $P_{SL4-P}$, $P_{SL5-P}$ outputted from the corresponding solenoid valves SL1–SL5. Since an amount of the hydraulic fluid outputted as the pilot pressure $P_{SL-P}$ by each solenoid valve SL, shown in FIG. 7B, is small, each solenoid valve SL may be of smaller size as compared with each solenoid valve SL, shown in FIG. 7A. However, the electromagnetic valve devices may have a different construction than those shown in FIGS. 7A and 7B, so long as those valve devices can output the respective control pressures $P_{SL1}$–$P_{SL5}$, independent of each other.

While the present invention has been described in its preferred embodiments by reference to the drawings, it is to be understood that the present invention may otherwise be embodied.

For example, in each of the illustrated embodiments, when the off-fail state of the electromagnetic valve devices occurs, the third speed step is established as the low or intermediate speed step, and the fifth speed step is established as the high speed step. However, one or more different speed steps may be established depending upon characteristics of the vehicle and/or the total number of speed steps of the automatic transmission 16.

In addition, in the second embodiment shown in FIG. 6, the second switching valve 204 is switched between its two operation states, by the signal pressure $P_S$ and the control pressures $P_{SL3}$–$P_{SL5}$. However, the second switching valve 204 may be modified such that the valve 204 is switched between its two operation states, by all the control pressures $P_{SL1}$–$P_{SL5}$, like the all-fail detecting valve 102 employed in the first embodiment shown in FIG. 5.

In addition, the hydraulic control circuit 100 and the hydraulic control circuit 200 are just examples of the hydraulic control circuit according to the present invention, and may be replaced with various hydraulic control circuits having different constructions, so long as each of those hydraulic control circuits can establish different speed steps corresponding to different states of the vehicle upon occurrence of the off-fail state of the electromagnetic valve devices, so that the vehicle can run appropriately after the occurrence of the off-fail state.

In each of the illustrated embodiments, a one-way clutch may be provided in a parallel relationship with the second brake B2 in the automatic transmission 16. In this case, the speed-change controlling operation can be easily carried out. For example, if the first clutch C1 is operated or engaged, the first speed step is established. The second brake B2 may be operated or engaged when an operation of an engine brake is needed. Therefore, when the vehicle is running forward, the off-fail state of the electromagnetic valve devices can be detected without detecting the control pressure $P_{SL4}$ outputted from the solenoid valve SL4 to control the second brake B2.

In each of the illustrated embodiments, the six forward speed steps are established by the automatic transmission 16 employing the combination of the three planetary gear sets 40, 42, 44. However, the automatic transmission 16 may be replaced with various automatic transmissions, so long as those transmissions can change speed steps by utilizing at least one of releasing and engaging (i.e., a non-operation and an operation) of hydraulically operated friction coupling devices, e.g., clutches C and brakes B. Therefore, the automatic transmission 16 may be replaced with a different one which is constituted by a different number of planetary gear sets than three, or with a different one which has a different number of forward speed steps than six, e.g., seven or five forward speed steps.

It is to be understood that the present invention may be embodied with various other changes, modifications and improvements that may occur to a person skilled in the art, in the light of the technical teachings of the present invention that have been described above.

What is claimed is:

1. A hydraulic control circuit for an automatic transmission of a vehicle, the automatic transmission including a plurality of hydraulically operated coupling devices at least one of which is selectively operated to establish a corresponding one of a plurality of speed steps, the hydraulic control circuit comprisinga plurality of electromagnetic valve devices which output respective hydraulic pressures to operate the hydraulically operated coupling devices, respectively;

an all-fail detecting and switching valve device which is switched, based on an all-fail state of the electromagnetic valve devices in which none of the electromagnetic valve devices output the respective hydraulic pressures, to an operation state corresponding to a fail position to output a first hydraulic pressure to a first hydraulically operated coupling device of the plurality of hydraulically operated coupling devices; and an operation-state memory valve which is switched, based on a state of the vehicle before the all-fail state of the electromagnetic valve devices occurs, from a non-running position indicating that the vehicle is not running, to a running position indicating that the vehicle is running, which is kept at one of the non-running position and the running position, and which supplies a source hydraulic pressure to a second hydraulically operated coupling device of the plurality of hydraulically operated coupling devices that corresponds to the non-running position and the first hydraulic pressure to a third hydraulically operated coupling device of the plurality of hydraulically operated coupling devices that corresponds to the running position.

2. The hydraulic control circuit according to claim 1, wherein the all-fail detecting and switching valve device comprises an all-fail detecting valve and a switching valve, and wherein in the all-fall state of the electromagnetic valve devices in which none of the electromagnetic valve devices output the respective hydraulic pressures, the all-fail detecting valve outputs the first hydraulic pressure to each of the operation-state memory valve and the switching valve, the switching valve supplies, when the first hydraulic pressure is inputted thereto, the first hydraulic pressure to the first hydraulically operated coupling device, and the operation-state memory valve supplies, as an operating hydraulic pressure, one of the source hydraulic pressure and the first hydraulic pressure to said one of the second and third hydraulically operated coupling devices that corresponds to said one of the non-running position and the running position at which the operation-state memory valve is kept.

3. The hydraulic control circuit according to claim 1, wherein a low or intermediate speed step of the plurality of speed steps is established when the first and second hydraulically operated coupling devices are operated, and a high speed step of the plurality of speed steps is established when the first and third hydraulically operated coupling devices are operated.

* * * * *